United States Patent [19]

Johnson

[11] Patent Number: 4,539,939

[45] Date of Patent: Sep. 10, 1985

[54] FLUIDIZED BED COMBUSTION APPARATUS AND METHOD

[76] Inventor: William B. Johnson, 522 Lewis Wharf, Boston, Mass. 02110

[21] Appl. No.: 667,075

[22] Filed: Nov. 1, 1984

Related U.S. Application Data

[63] Continuation of Ser. No. 330,794, Dec. 15, 1981, abandoned.

[51] Int. Cl.$^3$ .............................................. F22B 1/02
[52] U.S. Cl. .................................. 122/4 D; 110/245; 110/347; 165/104.16
[58] Field of Search ............... 122/4 D; 110/263, 347, 110/245; 165/104.16

[56] References Cited

U.S. PATENT DOCUMENTS

| | | |
|---|---|---|
| 2,377,935 | 6/1945 | Bunness . |
| 2,630,352 | 3/1953 | Degnen et al. . |
| 2,729,428 | 1/1956 | Milmore . |
| 2,818,049 | 12/1957 | Blaskowski et al. . |
| 3,119,379 | 1/1964 | Sweeney . |
| 3,241,520 | 3/1966 | Wurster et al. . |
| 3,306,236 | 2/1967 | Campbell . |
| 3,387,590 | 6/1968 | Bishop . |
| 3,397,657 | 8/1968 | Tada . |
| 3,508,506 | 4/1970 | Bishop . |
| 3,513,813 | 5/1970 | Towson et al. . |
| 3,589,313 | 6/1971 | Smith . |
| 3,645,237 | 2/1972 | Seth ..................................... 122/4 D |
| 3,702,595 | 11/1972 | Muirhead et al. . |
| 3,717,700 | 2/1973 | Robinson et al. . |
| 3,859,963 | 1/1975 | Robert et al. . |
| 3,893,426 | 7/1975 | Bryers . |
| 3,905,336 | 9/1975 | Gamble et al. . |
| 3,910,235 | 10/1975 | Highley . |
| 3,921,544 | 11/1975 | Reese . |
| 3,970,011 | 7/1976 | Virr et al. . |
| 3,992,558 | 11/1976 | Smith-Johanssen et al. . |
| 4,084,545 | 4/1978 | Nack et al. ........................ 122/4 D |
| 4,240,377 | 12/1980 | Johnson .......................... 110/245 X |

FOREIGN PATENT DOCUMENTS 1326651  8/1973  United Kingdom .

OTHER PUBLICATIONS

"Heat Transfer in Fast Fluidized Beds", by K. D. Kiang et al., Battelle, Columbus, Ohio, paper presented at International Conferences on Fluidization in Asilomar, California, Jun. 1975.

"Heat Transfer Characteristics of Fluidized Beds", by Mickley and Trilling, Industrial and Engineering Chemistry, vol. 41, No. 6, pp. 1135–1147 (1949).

"Heat Transfer to Flowing Gas-Solids Mixtures in a Circular Tube", by L. Farbar et al., Industrial and Engineering Chemistry, vol. 49, No. 7, Jul. 1957, pp. 1143–1150.

(List continued on next page.)

*Attorney, Agent, or Firm*—Morgan, Finnegan, Pine, Foley & Lee

[57] ABSTRACT

The invention includes the steps of, and suitable apparatus for, maintaining a plurality of relatively dense bead-like particles of inert solid material dispersed throughout the fluidized combustion bed, for circulation through heat exchange means separated from the combustion bed and return to the fluidized bed along with other bed constituents. Fine limestone particles may also be introduced into the combustion bed along with fresh fuel particles. The circulating bed constituents are discharged from an arched heat exchange outlet to direct the returning bed constituents in a generally horizontal direction directly over the combustion bed for generating increased circulation in the bed. In addition, the inlet for introduction of fresh fuel and fine limestone is located just below the arched discharge channel to enhance horizontal discharge velocity. A portion of the combustion chamber generally opposite the arched discharge channel is provided with a sloped wall segment to further enhance circulation within the bed.

44 Claims, 5 Drawing Figures

OTHER PUBLICATIONS

"Compound Heat Exchange Between a High Temperature Gas-Fluidized Bed and a Solid Surface", by S. Zabrodsky (Russian Author), Int. J. Heat Mass Transfer, vol. 16, pp. 241–248, 1973.

"Heat Transfer in a Dilute-Phase Fluidized Bed Tubular Heat Exchanger", by Genetti et al., I. Chem. E. Symposium Series No. 30 (1968: Instn. Chem. Engrs. London), pp. 147–156.

"Recirculating Fluidized-Bed Reactor Data Utilizing a Two-Dimensional Cold Model", by Yang et al., AIChE Symposium Series, No. 141, vol. 70, pp. 27–40.

"High Pressure Fluidized Beds", by Horsler et al., Chemical Engineering Process, vol. 65, No. 10, Oct. 1969, pp. 59–64.

"Pneumatic Conveyance and Continuous Fluidization of Solids", by Gopichand et al., Industrial and Engineering Chemistry, vol. 51, No. 12, Dec. 1959, pp. 1449–1452.

"New Date for . . . Heat Transfer to Fluidized Solids", Koble et al., Chemical Engineering, Sep. 1951, pp. 174–175.

"Heat Transfer to Objects Immersed in Fluidized Beds", by Baskakov et al. (Russian Authors), Powder Technology, 8, (1973), pp. 273–282.

"Fluidized-Bed Combustion Review", by H. Nack et al., Battelle, Columbus, Ohio, paper presented at International Conferences on Fluidization in Asilomar, California, Jun. 1975.

"Petroleum Refinery Engineering", by W. L. Nelson, McGraw-Hill Book Co., Inc., pp. 692–694 (1949).

*Primary Examiner*—Edward G. Favors

FLUIDIZED BED COMBUSTION APPARATUS AND METHOD

This is a continuation of application Ser. No. 330,794 filed Dec. 15, 1981, now abandoned.

BACKGROUND AND OBJECTS OF THE PRESENT INVENTION

The present invention relates generally to fluidized bed combustion and, more particularly, to certain new and useful improvements in fluidized bed combustion devices and methods for carrying out fluidized bed combustion.

Fluidized bed combustion is currently one of the most promising technologies for advances in the field of combustion furnaces, boilers, incinerators, etc., particularly in these days of exhorbitant energy costs and restrictive environmental protection regulations. A significant reason that fluidized bed combustion holds such promise is my previous invention described in detail in my U.S. Pat. No. 4,240,377 granted Dec. 23, 1980 the disclosure of which is hereby incorporated by reference herein.

Briefly, fluidized bed combustion permits the use of a wide range of solid, liquid and gaseous fuels, while at the same time reducing pollutants such as nitrous oxide and sulfur dioxide, and providing high combustion and heat exchange efficiencies when compared with conventional combustion techniques. This invention of my '377 patent enables higher combustion and heat exchange efficiencies than previously known fluidized bed combustion devices. Furthermore, it provides several control points to permit immediate variation of steam generating capacity.

Although numerous significant advantages are realized by my invention described in said Pat. No. 4,240,377 ("my '377 patent") over the prior state-of-the-art fluidized bed combustion techniques, there are certain aspects which can be improved to provide even further enhanced performance and improved efficiency. For example, the use of the solids circulation system coupled with the deletion of heat exchange tubes in the combustion bed resulted in much higher controlled heat transfer from the bed to the heat exchange surfaces. However, greater efficiency of combustion and heat exchange will enhance such controlled heat transfer.

In addition, despite the dramatically low production of sulfur dioxide, there is an economic need to minimize the amount of extraneous sulfur dioxide removing agent (e.g., limestone) added to the combustion chamber while still maximizing removal of the sulfur gas. Furthermore, despite the presence of cyclone gas-solids separators and/or various superheater tubes located above the combustion bed, it is important to retard the loss of fine particulate matter with the flue gas. The best way of doing so is by providing additional means for returning these fine particles to the combustion bed.

A significant drawback to conventional fluidized bed combustion devices is that limestone and ash must be removed from the combustion bed to maintain an equilibrium of reactivity within the bed. Such removal is usually done by "purging" the bed—i.e., by a continuous process of physically removing bed constitutents from the bed for disposal. This results in loss of the heat from the combustion zone as well as unreacted fuel and limestone particles. It also presents a significant disposal problem since dumping can contaminate the aquifer.

Finally, the efficiency of combustion can be enhanced by increasing the amount of movement, or circulation, of the bed particles. Thus, the greater the circulation of bed constituents within the burning zone, the more efficient the combustion of fuel particles and the greater the reaction to reduce sulfur dioxide.

Accordingly, it is an object of the present invention to further improve the overall efficiency of fluidized bed combustion and heat exchange in fluidized bed combustion, particularly in a boiler or like apparatus. It is a concomitant object of the invention to provide new and improved fluidized bed combustion devices and methods of carrying out fluidized bed combustion.

It is also an object of the present invention to provide a new and improved fluidized bed combustion apparatus and method of carrying out fluidized bed combustion providing heat exchange contact between constituents from the combustion bed and physically separated heat exchange means so as to ensure that the rate of heat exchange may be varied while at the same time constant temperature is maintained within the burning zone.

It is a further object of the invention to improve fluidized bed combustion by continuously reducing the size of limestone and ash particles in the combustion bed. As a result, final removal of spent particles in the form of fine dust-like ash and other similarly sized particulate matter collected at the flue gas exit. By the same token, it is also intended that the entrainment of the remaining unspent limestone, fuel particles and other bed constituents with the flue gases be restrained.

It is still another object of the invention to improve fluidized bed combustion by generating increased and, therefore, thorough circulation of bed constituents in the combustion bed. At the same time, it is intended to cause even distribution of the bed constituents not only to increase efficiency of combustion but also to enhance reactions in the bed such as the reaction of sulfur dioxide with limestone.

Various objects and advantages of the invention have been set forth above and are described in greater detail below. While such improved performance characteristics are specifically described herein, other improvements in various aspects of fluidized bed combustion and heat exchange will be apparent to those skilled in the art either by reason of this description or from practice with the invention as embodied in the novel and improved structures, instrumentalities, methodologies, operational steps and combinations thereof disclosed herein.

SUMMARY OF THE INVENTION

Briefly described, the improved fluidized bed combustion and heat exchange according to the present invention includes the steps of, and suitable apparatus for, maintaining a plurality of relatively dense bead-like particles of inert solid material dispersed throughout the fluidized combustion bed. As preferably embodied, the bed constituents, including the bead-like particles, are circulated through heat exchange means separated from the combustion bed and returned to the fluidized bed. In another aspect of the invention, fine limestone particles are introduced into the combustion bed along with, for example, fresh fuel particles and/or with the unspent fuel particles which may be removed from the flue gas by a gas-solids separation apparatus.

According to still another aspect of the invention, the bed constituents circulating from the fluidized combustion bed and through the heat exchange means are discharged back into the bed in such manner as to generate relatively high velocity flow of returning particles and establish a high degree of circulation within the burning zone—i.e., the combustion bed. Advantageously, the heat exchange means is vertically extending, with an upward flow portion and a downwardly flow portion which discharges the circulating particles back into the bed. The discharge end of the downward flow portion is arched to direct the returning bed constituents in a generally horizontal direction and is located directly over a portion of the combustion bed (rather than over a quiescent zone). In addition, the inlet for introduction of fresh fuel (and, preferably, fine limestone particles as well) is preferably located somewhere just below the arched discharge channel of the downward flow heat exchange means to join the horizontal discharge flow of particles for enhancing the flow velocity of the returning particles.

Also advantageously, a portion of the combustion chamber generally opposite the arched discharge channel is provided with a sloped wall segment to enhance circulation within the bed by preventing any tendency of the circulating particles to collect in a "dead corner."

It will be appreciated by those skilled in the art that the objects and advantages specifically recited herein are achieved by the present invention as disclosed and claimed herein. Thus, it will be found that by maintaining inert bead-like particles distributed throughout the combustion bed, heat transfer from the fluidized bed constituents in the heat exchange means is enhanced. Moreover, the solids act as a grinding agent for both the limestone particles and the fuel particles in the bed. Thus, they continuously expose fresh surface area of the limestone to react with sulfur dioxide, providing for continuous removal of the sulfur gas. They also reduce the size of the ash particles to permit removal of spent fuel at the dust collection flue gas exit and grind ash from the surface of the fuel particles. At the same time, when circulated in a vertically extending heat exchange means, the "cascade" of these bead-like particles returning from the down-flow portion of the heat exchange means serves to return some of the particles entrained in the flue gas back to the combustion bed.

It will also be found that by introducing fresh fine limestone particles into the combustion bed, additional particular matter is available to act as a heat exchange medium between the bed constituents and the system heat exchange means, whether it be cycled through vertically extending heat exchange means or whether it contact some type of superheater located above the fluidized bed. More importantly, the finely particulatized limestone provides additional fresh surface area for reacting with sulfur dioxide to remove the sulfur gas from the system. When used in a system having the inert bead-like particles circulating in the combustion bed, the introduction of such fresh limestone particles greatly increases the availability of fresh limestone surface area.

A particularly useful advantage of the combined use of the inert bead-like particles and fresh limestone is that there is no need to "purge" the combustion bed to remove partially sulfated limestone because the sulfated surface of the limestone is continuously ground away by the bead-like particles. Thus, there is no need to maintain a continuous withdrawal of the bed constituents and risk losing good fuel particles, unspent limestone particles or the heat contained in these particles. In addition, there are no significant handling problems, as the fully spent fuel and limestone (both in the form of dust-like ash particles) can be removed in the "bag house" after their heat has been transferred to steam generating surfaces.

It will further be found that by locating the quiescent zone remote from the discharge outlet of the vertical heat exchange means and by forming a horizontally directing arched discharge section at the outlet of the down flow portion of the heat exchanger, the returning bed constituents are discharged in a generally horizontal direction to provide a circulatory influence on the combustion bed. In addition, by locating the fresh fuel/limestone inlet directly below the arched discharge outlet and in a horizontal orientation, the force of injecting these fresh particles combines with the momentum of horizontally discharged particles from the heat exchanger to enhance the distribution of the fuel/limestone and the circulatory influence on the combustion bed. Furthermore, the use of a sloped wall in the combustion chamber generally opposite the arched discharge outlet further enhances circulation in the bed.

DETAILED DESCRIPTION OF PREFERRED EMBODIMENTS

Figures 1, 5:
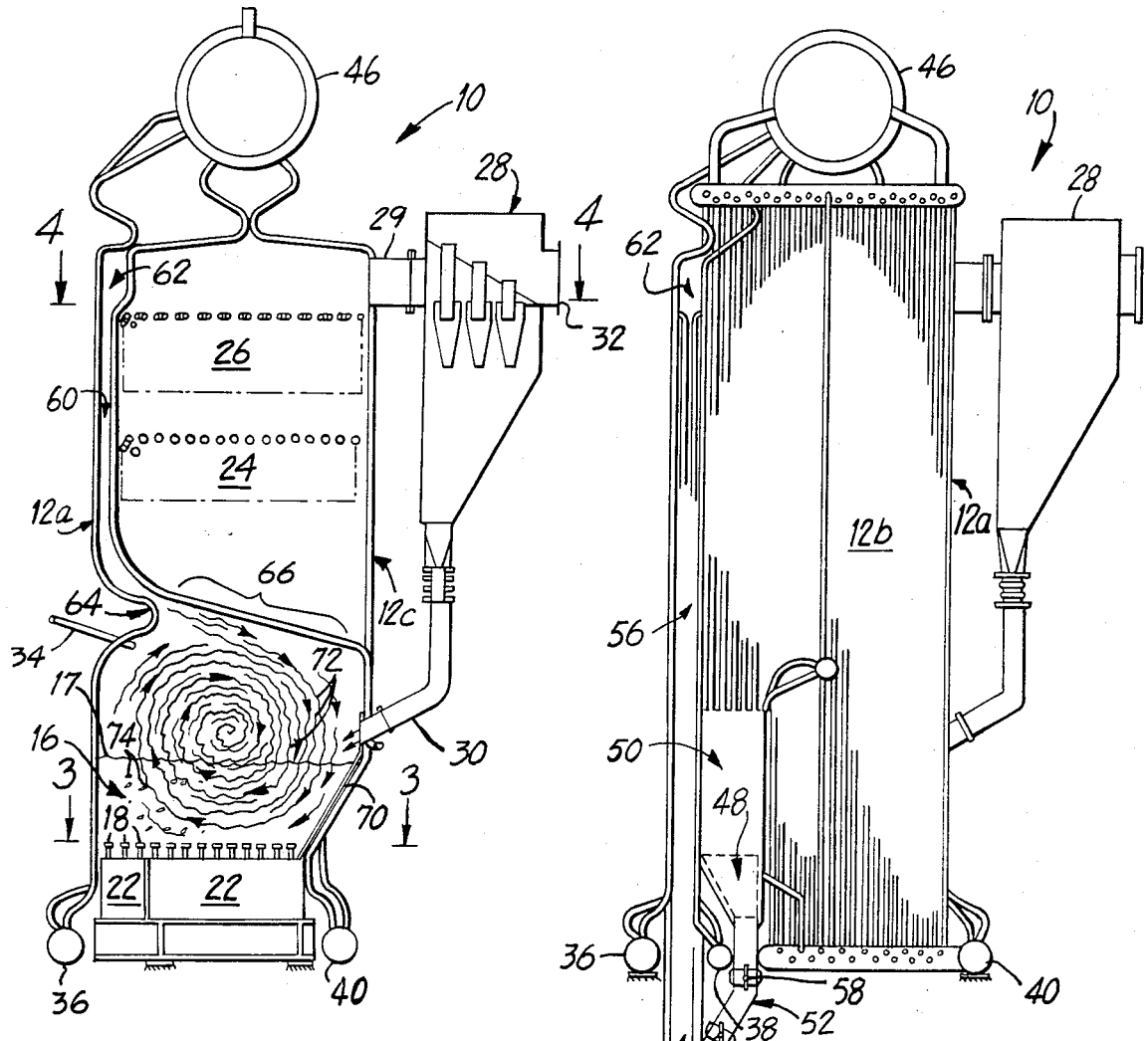
FIG. 1 is schematic sectional view of a fluidized bed combustion boiler incorporating various features of the present invention.
FIG. 5 is a sectional view taken along lines 5—5 of FIG. 2.

Turning now to the accompanying drawings, wherein like reference characters refer to like parts throughout the various views, there is shown an embodiment of a fluidized bed combustion boiler (indicated generally at 10) adapted to utilize the various features of the present invention. Referring particularly to FIG. 1, the boiler 10 is formed with vessel walls having heat exchange tubes generally interconnected by webbing generally as described in my aforesaid '377 patent. There are four basic vessel walls, front wall 12a, side walls 12b and 12d (which mirror image each other) and back wall 12c.

The floor 14 of the boiler chamber is adapted to introduce an oxygen-containing fluidizing gas (assumed here to be air) into the combustion zone (indicated generally at 16). As here embodied, the combustion chamber floor 14 includes gas introduction means in the form of a plurality of nozzles 18 formed on distributor plate 20 which is positioned on top of air plenum chambers 22 to form the floor of the combustion vessel. The plenum chambers are coupled to a source (not shown) of the fluidizing air in any conventional manner and nozzles 18 are of the bubble-cap type.

Above the bed are located evaporator screen tubes (described hereinafter) and, above them, a set of superheater heat exchange tubes (indicated generally at 24) for super heating the heat exchange medium (usually a fluid such as water) and economizer tubes (indicated at 26) for initial preheating of the heat exchange medium by the rising flue gases and particles entrained therein. It will be understood that any other desired heat exchange tube arrangements can be utilized above the combustion bed.

A gas-solids separator (here a cyclone separator) 28 is coupled (by conduit 29) to the boiler vessel 10 for removing any unspent bed particles which may be entrained in the flue gas rising from the bed and returning them to the fluidized combustion bed. To this end, separator 28 is coupled to reintroduction conduit 30 which discharges the separated out particles back into the fluidized bed, and an outlet 32 which leads the essentially particle-free flue gas to the exhaust stack or other flue gas exit of the facility. Of course, since tiny particulate matter such as fly ash will still be entrained in the flue gas, the cyclone treated gas should be subjected to a final "cleansing" action, such as passing through a "bag house", to filter out these superfine particles before expelling the flue gas into the atmosphere.

Figure 2:
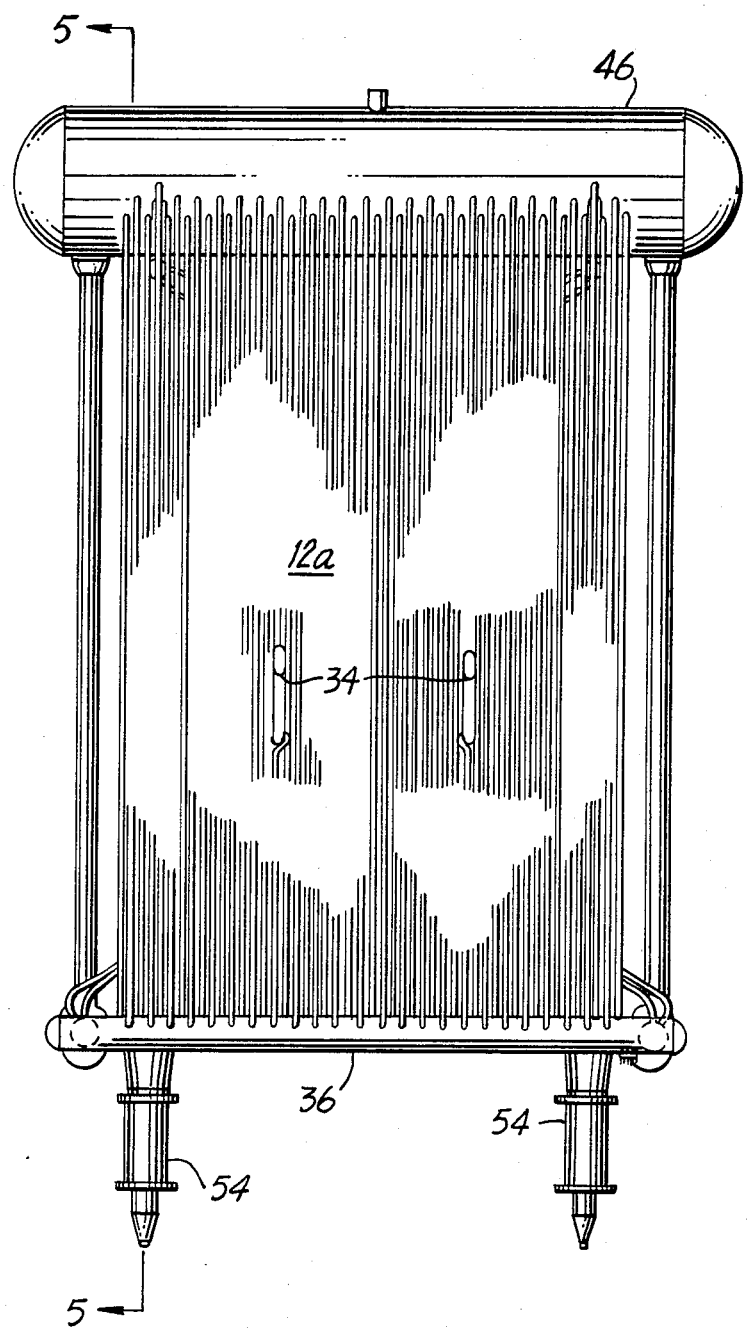
FIG. 2 is a front elevation view of the boiler of FIG. 1.

The fluidized bed combustion boiler also includes an inlet 34 (two are shown in FIG. 2) for introducing fresh fuel and, as an aspect of the invention described below, finely divided particles of limestone. The walls of heat exchange tubes are coupled to various headers such as header segments 36 and 40 along the front and back chamber walls and header segments 42-45 along the vessel side walls, as well as steam-water separator boiler drum 46 at the top of the boiler. Another water header 38 is formed along the bottom inside of each upward flow heat exchange chamber segment, described more fully below.

According to one aspect of the present invention, a solids recirculation system is utilized similar to my aforesaid '377 patent. There is at least one quiescent zone (i.e., an area free of direct influence by the fluidizing gas) provided which is laterally offset from the main fluidized bed for enabling withdrawal of a portion of the fluidized bed constituents. As here preferably embodied, there are two such quiescent zones, each provided by a funnel-like withdrawal member 48 formed at the bottom of the off-set quiescent chamber housing 50 which is laterally offset from the main combustion bed. Each withdrawal member 48 is coupled by suitable conduit members (indicated generally at 52) to the base portion 54 of a vertically extending heat exchange chamber 56 which is generally like that disclosed in my aforesaid '377 patent. The base 54 of each vertical heat exchange chamber 56 prefereably includes means for introducing air or a like oxygen containing gas for upward flow through the heat exchange chamber, and may include valve means (such as butterfly valves 58) for controlling the flow of solids through the heat exchanger, for the same purposes disclosed in my aforesaid '377 patent. The withdrawal conduit 52 may provide a generally U-shaped duct (as disclosed in my '377 patent) or it generally form a more Y-shaped configuration with the base 54 of the vertical heat exchanger, as shown in FIG. 5.

Figure 3:
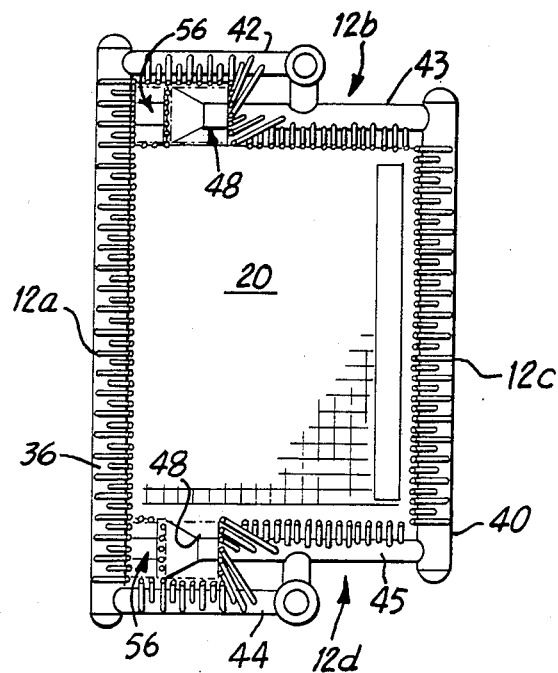
FIG. 3 is a sectional view taken along lines 3—3 of FIG. 1.
Figure 4:
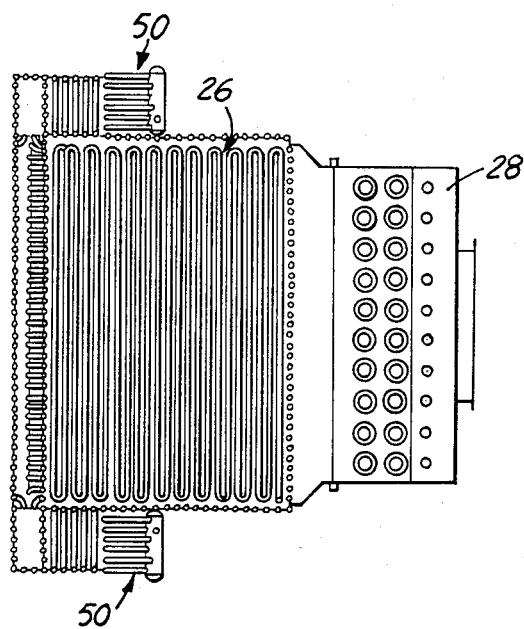
FIG. 4 is a sectional view taken along lines 4—4 of FIG. 1.

As here embodied, the upward-flow portion 56 of each vertical heat exchanger more-or-less extends along the exterior sides of the boiler vessel as best shown in FIGS. 3 and 5. The top of the upward-flow heat exchange chamber 56 opens into a downward-flow heat exchange chamber 60 (by an intermediate segment 62), much like my '377 patent. As here embodied, the downward-flow heat exchange chamber 60 extends along essentially the entire width of front wall 12a of the boiler vessel as shown in FIG. 1. The up-flow portion 56 and the down flow portion 60 are formed primarily by walls of heat exchange tubes like those disclosed in my '377 patent. It will be understood that intermediate walls of heat exchange tubes can be placed within the down flow chamber 60 to form a plurality of smaller chambers for additional heat exchange surface area, similar to my '377 patent.

According to another aspect of the invention, the bottom, or discharge, portion (64) of down-flow chamber 60 includes an arched portion providing a "slide" adapted to discharge particles in a generally horizontal direction. The lower "slide" portion of arch 64 is formed of the same webbed heat exchange tubes as segments 56 and 60, while the upper portion (indicated at 66 and comprising evaporator screen tubes) which extends directly over the bed should have openings or spaces between the heat exchange tubes to permit upward flow of flue gases yet act as another impingement barrier for particles entrained in the flue gases. As preferably embodied, the arched discharge duct 64 is on the same wall as fuel/limestone inlet 34 which is advantageously located just below the arched duct 64 and oriented to inject the fresh fuel particles (and limestone) in a generally horizontal direction to add momentum to the horizontal flow of discharged particles from arched duct 64.

According to still another aspect of the invention, a portion of the vessel containing wall opposite arched discharge duct 64 (i.e., back wall 12c) is sloped (as indicated at 70) towards the arched discharge duct to further enhance circulation of the constituents of the bed and at the same time reduce the expensive grid area for distributing air. As here embodied, sloped wall 70 is at an angle of from about 45° to about 75° (and preferably about 60°) with respect to the combustion chamber floor. Advantageously, the top of sloped wall 70 is just below the outlet of cyclone return duct 30 which, in turn, is somewhat below the arched discharge duct 64 so that the discharge flow from return duct 30 is very roughly tangential to the circulatory flow (indicated in FIG. 1 by spiral-like lines 72) generated by the returning solids discharged from arched discharge outlet 64. It will similarly be understood that inlet 34 is advantageously oriented so that fresh fuel (and limestone particles) is injected roughly tangential to the circulatory flow lines 72 to help enhance the circulation.

The presence of the sloped wall 70 (which could also be curved to conform generally to the shape of circulatory flow 72) further aids circulatory flow in the combustion bed by eliminating the possible "dead spot" at the corner of the combustion bed floor directly opposite arched discharge duct 64. Although a similar wall could be provided at the opposite corner, it is not believed necessary because the gas distributing nozzles 18 under the arched section 64 do more to enhance the circulatory flow at that point by their upwardly directed gas flow.

In operation, the combustion bed constitutents are fluidized by air forced through nozzles 18 from plenum chambers 22 to form fluidized bed 16 having a general level indicated at 17. After the fluidized bed has been fired up and has reached its desired operating temperature, the valve(s) 58 are opened in withdrawal duct 52 and air forced upwardly into chamber 54 through inlet 53, thereby causing a pressure differential between the upward-flow heat exchange chamber 56 and the fluidized bed 16. As a result, fluidized bed constituents in the vicinity of the quiescent chambers 50 are drawn off from the bed (which also enhances the lateral movements of the particles in the bed) and travel upwardly through chamber 56.

When the particles reach the top of chamber 56, they are forced through intermediate heat exchange chamber 62 and thence into down-flow chamber 60 which, advantageously, extends along the entire front wall 12a of the combustion chamber. The speed of the flowing particles tends to increase due to the influence of gravity so that they are discharged at a higher velocity than the riser section. The particle withdrawal and the up and down flows are generally similar in nature to that described in my aforesaid '377 patent.

The arched discharge outlet 64, preferably formed with a relatively gradual curvature to avoid any impeding effect on the particle flow but terminating with a relatively horizontal end segment, directs the returning particles in a generally horizontal direction. The vector resultant of the velocity of discharge and the downward influence of gravity generate a generally curved flow path of the particles as they increase their distance from the discharge outlet. As the particle flow nears the back vessel wall 12c, the particles are turned downwardly towards the bed, where the upward force from the fluidizing gas and the particles in the bed tends to turn the flow towards front vessel wall 12a. The net result is a spirally or circulatory influence on the main bed particles caused by the returning particles discharged from their flow through the heat exchange chambers. This additional agitation in the combustion bed helps improve combustion and, therfore, increases efficiency.

Because the quiescent chambers 50 and withdrawal assemblies 48/52 are laterally offset from the main combustion bed and not, therefore, directly under arched discharge duct 64, the returning particles discharged from duct 64 are essentially free of any influence from the quiescent chambers 50. In addition, and as an advantage of the additional inventive features disclosed herein, the somewhat horizontally oriented inlet 34, the cyclone return duct 30 and the sloped wall 70 each enhance the circulatory flow of returning particles. Operating experience has shown that essentially all combustion takes place within the bed as opposed to other fluidized bed combustion systems where an appreciable amount of combustion occurs in the free-board portion of the bed—i.e., immediately above the combustion bed—which reduces the ability to control combustion temperature and results in lower combustion efficiency.

According to still another aspect of the invention, the composition of the fluidized bed has been modified to improve performance greatly. Dispersed throughout the fluidized combustion bed are numerous relatively dense bead-like members (indicated at 74) made of a hard inert material, such as fused alumina beads, of an inventory of about 100 to about 400 pounds per square foot. The beads preferably have substantially smooth surfaces to prevent erosion and are in the size range of 20 to 80 mesh and have a density of about 3.6 gm/cc.

The bead-like members 74 are dispersed generally evenly throughout the bed 16 so as to form one of the components of the withdrawn particulate flow through the heat exchange means. The beads act both as an additional heat exchange medium to transfer heat within the heat exchange chambers and as a grinding agent for the combustion bed constituents. The latter is particularly important because by grinding, and reducing the size of, the bed particles, the beads act to continuously renew fresh surface area of the reactive particles in the bed, particularly the fuel particles (e.g., coal) and the limestone particles.

Accordingly, already combusted surface portions of the fuel particles, in the form of ash, are ground off (and ground down) in the form of fine ash particles which are then entrained in the flue gas and can exit the combustion chamber for subsequent simple removal at the dust collection station of the flue gas exit. Equally significant is grinding effect on the limestone particles.

During fluidized combustion, the limestone serves to remove sulfur dioxide from the resultant gases of combustion. The basic reaction involves a calcining process at the surface of the limestone and simultaneously sulfating of the surface to calcium sulfate. The calcium sulfate coating acts like a protective barrier on the limestone to block any further reaction with the sulfur gas to form calcium sulfate. The bead-like members according to the present invention provide a continuously functioning grinding means to grind off the calcium sulfate coating and expose fresh limestone surface for reacting with and capturing more sulfur dioxide. The resultant calcium sulfate can then be removed along with the fly ash and other fully spent particles at the dust collection station at the flue gas exit.

It will also be appreciated that the heat exchange circulation of bead-like members 72 with the other bed constitutents helps prevent loss of unspent particles with the flue gas. As these particles are discharged from arched duct 64, they form a "cascade" of solid particles acts to force the larger (unspent) bed constitutents which tend to rise from the combustion bed back into the bed.

According to still a further aspect of the invention, particularly advantageous when combined with the presence of bead-like members 72 in the bed, fine particles of fresh limestone are added directly to the combustion bed, advantageously along with fresh fuel particles through inlet 34. The injection of fresh limestone replenishes the limestone which has already reacted with the sulfur dioxide to maintain a generally constant supply of reactable limestone in the combustion bed for maintaining continuous sulfur dioxide removal.

In combination with the bead-like members 72 in the bed, the continuous addition of fresh limestone obviates the need for "purging" the combustion bed as is required in conventional fluidized bed combustion. Thus, the known disadvantages of such "purging" are completely eliminated. There is no need for a wasteful continuous removal of the bed constituents which results in some loss of good fuel and unreacted limestone. Furthermore, the problem of handling these materials, including leaching in the aquifer when they are dumped, are completely eliminated.

It will be understood that variations may be made from the specific embodiment disclosed herein, which are still within the scope and spirit of the invention as herein disclosed and claimed, without departing from the basic principles of the invention or sacrificing its chief advantages.

What is claimed is:

1. An improved fluidized bed combustion apparatus having a combustion chamber adapted to provide a fluidized bed of particulate matter, including combustible fuel particles, generally supported on a support member adapted to permit introduction of a fluidizing gas medium into the particulate matter and an inlet for introducing at least fresh combustible fuel particles into the fluidized bed, wherein the improvement comprises:

heat exchange means generally separated from the fluidized bed, said heat exchange means including flow communicated up-flow and down-flow portions for permitting circulation of particulate matter from the fluidized bed, through said heat exchange means and back into the fluidized bed, said down flow portion including a discharge outlet adapted to direct any circulating particulate matter travelling downwardly through said down-flow portion in a generally horizontal direction over the fluidized bed; and withdrawal means for withdrawing some of the particulate matter from the fluidized bed and introducing withdrawn particulate matter into said up-flow portion of said heat exchange means, said withdrawal means being located generally laterally distant from said discharge outlet so as not to be located directly below said discharge outlet, such that particulate matter leaving said discharge outlet is generally unaffected by any withdrawal forces generated by said withdrawal means and is permitted to exert a circulatory influence on the fluidized bed.

2. An improved apparatus according to claim 1, wherein said withdrawal means includes a quiescent zone adjacent the fluidized bed, generally undisturbed by direct exposure to the fluidizing gas medium, and conduit means providing flow communication between said quiescent zone and said up-flow heat exchange portion.

3. An improved apparatus according to claim 2, wherein said quiescent zone is formed by a generally separate chamber-like compartment adjacent the fluidized bed.

4. An improved apparatus according to claim 2, wherein said conduit means is controllable to control rate of particle flow therethrough.

5. An improved apparatus according to claim 4, wherein said withdrawal means further includes means for introducing gas upwardly through said up-flow portion of said heat exchange means.

6. An improved apparatus according to claims 1, 2 or 3, wherein there are two said withdrawal means and two said up-flow heat exchange portions coupled thereto.

7. An improved apparatus according to claim 6, wherein said two up-flow heat exchange portions are coupled to generally the same down-flow heat exchange means.

8. An improved apparatus according to claim 7, wherein said down-flow heat exchange portion extends generally the width of a wall making up said combustion chamber.

9. An improved apparatus according to claim 1, wherein said combustion chamber includes a sloped wall portion generally opposite said discharge outlet to facilitate the circulatory influence on the fluidized bed by particles being discharged from said discharge outlet.

10. An improved apparatus according to claim 1 or 9, wherein the fresh fuel particle inlet is located generally adjacent said discharge outlet and oriented generally horizontally such that fresh fuel particles injected into said combustion chamber generally add momentum to particulate matter being discharged from said discharge outlet to enhance said circulatory influence.

11. An improved apparatus according to claim 10, which further includes gas/solids separator means adapted to remove particles entrained in heated flue gases rising from the fluidized bed and return removed particles to the fluidized bed, said separator means including return means for returning removed solids back into the fluidized bed, in a direction generally adapted to enhance the circulatory influence of particulate matter exiting said discharge outlet to the fluidized bed.

12. An improved apparatus according to claim 1, wherein said down-flow heat exchange portion includes a segment of screen heat exchange means extending generally over the fluidized bed, said screen heat exchange means permitting upward flow of heated flue gases rising from the bed, yet acting as an impingement barrier to particles entrained in flue gases rising from the bed in addition to providing heat exchange function.

13. An improved apparatus according to claim 1, wherein combustion within said fluidized bed is carried out by burning the fuel particles and wherein the particulate matter in the fluidized bed includes a plurality of relatively dense bead-like particles made of generally inert material, said bead-like particles being dispersed generally throughout the bed to act as a grinding agent to partially reacted particulate matter in the bed and said bead-like particles being adapted to be withdrawn by said withdrawal means along with other bed particulate matter for circulation through said heat exchange means.

14. An improved apparatus according to claim 13, wherein each said bead-like particle is substantially smooth to prevent erosion of the bead-like particles.

15. An improved apparatus according to claim 13 or 14, which further includes means for introducing relatively fine particles of limestone into the fluidized bed.

16. An improved apparatus according to claim 15, wherein said limestone particle introduction means comprises the inlet for fresh fuel particles.

17. An improved apparatus according to claim 13 or 14, wherein said bead-like particles are in the size range of about 20 to about 80 mesh.

18. An improved fluidized bed combustion apparatus having a combustion chamber adapted to provide a fluidized bed of particulate matter, including combustible fuel particles which are burned to support combustion, the fluidized bed being generally supported on a support member which is adapted to permit introduction of a fluidizing gas medium into the particulate matter and an inlet for introducing at least fresh combustible fuel particles into the fluidized bed, wherein the improvement comprises:

a plurality of relatively dense bead-like particles made of a generally inert material, said bead-like particles being dispersed generally throughout the fluidized bed to act as a grinding agent to partially reacted particulate matter in the bed, said bead-like particles being adapted to be withdrawn along with other fluidized bed constituents for circulation through the heat exchange means and discharge back into the fluidized bed, said heat exchange means being generally separated from the combustion bed; and withdrawal means for withdrawing bead-like particles and other fluidized bed particles from the fluidized bed, said withdrawal means being located generally laterally distant from any location where particles are discharged back into the fluidized bed from the heat exchange means.

19. An improved apparatus according to claim 18, wherein each said bead-like particle is substantially smooth to prevent erosion of the bead-like particles.

20. An improved apparatus according to claim 18 or 19, which further includes means for introducing relatively fine particles of limestone into the fluidized bed.

21. An improved apparatus according to claim 20, wherein said limestone particle introduction means comprises the inlet for fresh fuel particles.

22. An improved apparatus according to claim 18 or 19, wherein said bead-like particles are in the size range of about 20 to about 80 mesh.

23. An improved method of carrying out fluidized bed combustion and transfer of heat generated from combustion of the fluidized bed, wherein the improvement comprises:
   providing for withdrawal of some particulate matter from the fluidized bed and causing the withdrawn particulate matter to flow through heat exchange means generally separated from the fluidized bed and back to the fluidized bed; and
   discharging withdrawn particulate matter leaving the heat exchange means in a generally horizontal direction over the fluidized bed, said particulate matter being withdrawn from the fluidized bed at a location generally laterally distant from where the withdrawn particulate matter is discharged from the heat exchange means, such that particulate matter discharged from the heat exchange means is generally unaffected by the withdrawal of particulate matter and tends to establish a circulatory influence on the fluidized bed.

24. An improved method according to claim 23, wherein the withdrawn particulate matter flows in generally vertical directions through the heat exchange means.

25. An improved method according to claim 24, wherein said step of withdrawing particulate matter from the fluidized bed is carried out through a quiescent zone, generally undisturbed directly by fluidizing gas medium, adjacent the fluidized bed and conduit means providing flow communication between the quiescent zone and the heat exchange means.

26. An improved method according to claim 23, 24, or 25, wherein particulate matter is withdrawn from at least two different areas of the fluidized bed.

27. An improved method according to claim 23, which further includes introducing fresh fuel particles into the fluidized bed in a direction adapted to enhance the circulatory influence generated by particles discharged from the heat exchange means.

28. An improved method according to claim 27, which further includes the step of removing particulate matter entrained in flue gases rising from the fluidized bed from the flue gases and re-introducing the removed particles back into the fluidized bed in a direction adapted to enhance said circulatory influence.

29. An improved method according to claim 23, 27 or 28, which further includes forming a generally sloped wall segment generally opposite discharge outlet of the heat exchange means.

30. An improved method according to claim 23, wherein at least some of the particulate matter in the fluidized bed are burned to sustain combustion and wherein the particulate matter in the fluidized bed includes a plurality of relatively dense bead-like particles made of generally inert material, said bead-like particles being dispersed generally throughout the bed to act as a grinding agent to partially reacted particulate matter in the bed and wherein said bead-like particles are adapted to be withdrawn along with other particulate matter from the bed for circulation through the heat exchange means.

31. An improved method according to claim 30, wherein each said bead-like particle is substantially smooth to prevent erosion of the bead-like particles.

32. An improved method according to claim 30 or 31, which further includes means for introducing relatively fine particles of limestone into the fluidized bed.

33. An improved method according to claim 32, wherein said limestone particle introduction means comprises the inlet for fresh fuel particles.

34. An improved method according to claim 29 or 30, wherein said bead-like particles are in the size range of about 20 to about 80 mesh.

35. An improved method of carrying out fluidized bed combustion of combustible particles within the fluidized bed, wherein the improvement comprises:
   providing a plurality of relatively dense bead-like generally inert particles dispersed generally throughout the fluidized bed to act as a grinding agent to partially reacted particulate matter in the bed, said bead-like particles being adapted to be withdrawn from the bed along with other fluidized bed particles for circulation through the heat exchange means; and
   discharging withdrawn bead-like particles and fluidized bed particles from the heat exchange means in a generally horizontal direction over the fluidized bed at a location which is generally laterally separated from any location where particles are withdrawn from the fluidized bed.

36. An improved method according to claim 35, wherein each said bead-like particle is substantially smooth to prevent erosion of the bead-like particles.

37. An improved method according to claim 35 or 36, which further includes means for introducing relatively fine particles of limestone into the fluidized bed.

38. An improved method according to claim 37, wherein said limestone particle introduction means comprises the inlet for fresh fuel particles.

39. An improved method according to claim 35 or 36, wherein said bead-like particles are in the size range of about 20 to about 80 mesh.

40. An improved fluidized bed combustion apparatus having a combustion chamber adapted to provide a fluidized bed of particulate matter located over a support member adapted to permit introduction of a fluidizing gas medium to fluidize the particulate matter, and means for introducing fresh fuel into the combustion chamber, wherein the improvement comprises:
   heat exchange means adapted to receive particulate matter from the fluidized bed for flow therethrough in heat exchange relation, said heat exchange means including a discharge outlet adapted to discharge particulate matter flowing through said heat exchange means in a generally horizontal direction for return to the fluidized bed;
   withdrawal means for withdrawing particulate matter from the fluidized bed and introducing it into said heat exchange means, said withdrawal means having its inlet located generally laterally distant from said discharge outlet of said heat exchange means; and
   a sloped wall portion in said combustion chamber, located generally opposite said discharge outlet of said heat exchange means, such that particulate matter withdrawn from the fluidized bed, after flowing through said heat exchange means, is discharged generally horizontally over the bed to impart a generally horizontal movement within the bed until reaching said sloped wall which tends to direct generally horizontally moving particulate matter downwardly to generate circulation of particles within the bed.

41. An improved fluidized bed combustion apparatus according to claim 40, which includes a plurality of said withdrawal means, each having its inlet generally laterally spaced from the discharge outlet of said heat exchange means.

42. An improved fluidized bed combustion apparatus according to claim 41, wherein combustion within the fluidized bed is carried out by burning of particulate matter in the fluidized bed, and which further includes a plurality of relatively dense bead-like particles made of generally inert material, said bead-like particles being dispersed generally throughout the bed to act as a grinding agent to particulate matter in the bed, said bead-like particles being adapted to be suspended in the fluidized bed and to be withdrawn by said withdrawal means for flow through said heat exchange means along with other particulate matter of the fluidized bed.

43. An improved fluidized bed combustion apparatus according to claim 42, wherein said bead-like particles are in the size range of from about 20 mesh to about 80 mesh.

44. An improved fluidized bed combustion apparatus according to claim 42, wherein said fresh fuel introduction means also introduces relatively fine particles of limestone into the fluidized bed.

* * * * *